US008027980B2

(12) United States Patent
Westendorf et al.

(10) Patent No.: US 8,027,980 B2
(45) Date of Patent: Sep. 27, 2011

(54) METHODS AND COMPUTER SYSTEMS FOR DATA ASSIGNMENT

(75) Inventors: Frank Westendorf, Ubstadt-Weiher (DE); Michael Ihle, Forst (DE); Daniel Waasmaier, Wiesloch (DE); Norbert Schröder, Bergisch-Gladbach (DE)

(73) Assignee: SAP AG, Walldorf (DE)

( * ) Notice: Subject to any disclaimer, the term of this patent is extended or adjusted under 35 U.S.C. 154(b) by 1269 days.

(21) Appl. No.: 10/792,865

(22) Filed: Mar. 5, 2004

(65) Prior Publication Data
US 2004/0254941 A1 Dec. 16, 2004

(30) Foreign Application Priority Data

Mar. 6, 2003 (DE) .................................. 103 10 998
Mar. 6, 2003 (DE) .................................. 103 10 999
Apr. 17, 2003 (WO) ........................ PCT/EP03/04071

(51) Int. Cl.
*G06F 7/00* (2006.01)
*G06F 17/30* (2006.01)
(52) U.S. Cl. ........................................ 707/737; 707/752
(58) Field of Classification Search .................. 707/1–4, 707/100, 736–737, 752
See application file for complete search history.

(56) References Cited

U.S. PATENT DOCUMENTS

| 5,383,112 | A | * | 1/1995 | Clark .................................. 705/8 |
| 5,604,899 | A | * | 2/1997 | Doktor .............................. 707/3 |
| 5,630,072 | A | * | 5/1997 | Dobbins ........................ 705/22 |
| 5,873,093 | A | * | 2/1999 | Williamson et al. ...... 707/103 R |
| 6,023,699 | A | * | 2/2000 | Knoblock et al. ............... 707/10 |
| 6,052,672 | A | * | 4/2000 | Foster .............................. 705/35 |
| 6,336,124 | B1 | * | 1/2002 | Alam et al. .................... 715/205 |
| 6,341,289 | B1 | | 1/2002 | Burroughs et al. |
| 6,408,295 | B1 | * | 6/2002 | Aggarwal et al. ............. 707/694 |
| 6,484,166 | B1 | * | 11/2002 | Maynard ........................ 707/694 |
| 6,539,388 | B1 | * | 3/2003 | Hattori et al. .................. 707/101 |
| 6,567,824 | B2 | * | 5/2003 | Fox ............................. 707/104.1 |
| 6,633,884 | B2 | * | 10/2003 | Martin et al. .................. 707/101 |
| 6,701,313 | B1 | * | 3/2004 | Smith ................................ 707/6 |
| 6,745,200 | B2 | * | 6/2004 | Starkey ......................... 707/102 |
| 6,807,576 | B1 | * | 10/2004 | Jeffries et al. ................. 709/225 |
| 6,847,941 | B2 | * | 1/2005 | Ower .............................. 705/28 |
| 7,401,087 | B2 | * | 7/2008 | Copperman et al. .......... 707/101 |
| 2002/0083444 | A1 | * | 6/2002 | Blasko et al. .................... 725/35 |
| 2002/0087544 | A1 | | 7/2002 | Selkirk et al. |
| 2003/0023516 | A1 | * | 1/2003 | Sharrow et al. ................. 705/28 |
| 2003/0028545 | A1 | | 2/2003 | Wang et al. |
| 2003/0187874 | A1 | * | 10/2003 | Peschel et al. ............. 707/104.1 |

OTHER PUBLICATIONS

European Search Report for EP 06012520.0, dated Aug. 28, 2006 (3 pages).

* cited by examiner

*Primary Examiner* — John R. Cottingham
*Assistant Examiner* — Michael Pham
(74) *Attorney, Agent, or Firm* — Finnegan, Henderson, Farabow, Garrett & Dunner LLP

(57) ABSTRACT

Methods and computer systems are provided for data assignment. A computing unit and a data object component for managing a set of data objects are provided. Data objects of the set of data objects can be divided into segments according to selectable criteria. An interface unit may also be provided to interconnect the computing unit and the data object component. The interface unit may be arranged and constructed to include an inventory assignment of segments created in the data object component such that, in case of an assignment inquiry by the computing unit, an assignment of one or more segments being inquired for is carried out in the interface unit.

19 Claims, 5 Drawing Sheets

METHODS AND COMPUTER SYSTEMS FOR DATA ASSIGNMENT

FIELD OF THE INVENTION

The present invention relates to the field of data assignment and, more particularly, to methods for data assignment in a computer system, as well as computer systems which are suitable to perform data assignment. The invention further relates to a computer program product with a computer-readable medium and a computer program stored on the computer-readable medium with program coding means suitable for carrying out the inventive methods when the computer program is run on a computer system.

BACKGROUND OF THE INVENTION

In inventory-oriented software solutions that find use in inventory data objects in various business fields, a data object component manages a set of (inventory) data objects. A computing unit is interconnected with the data object component via an interface. Data objects may be classified into segments according to selectable criteria so that the computing unit can access selected/classified data objects via specific segment access in order to perform certain tasks.

One example of an inventory-related software solution can be found in the field of insurance companies, which use software solutions to manage their insurance contracts and their clients' data. Inventory in this specific example could mean the sum of all insurance contracts and/or the clients of a given insurance company. The data objects describing the insurance contracts and/or the clients are called business objects. A segment is then a subset of business objects of a given business object type. These subsets, i.e., segments, are created by individual assignment or by classifying the business objects according to one or several criteria, such as geographical criteria (e.g., region, county, district), product related criteria (e.g., health insurance, life insurance, car insurance, etc.) or client group criteria (e.g., private client, business client, industrial client). Depending on a given context, a business object can be classified into one or more segments, i.e., belong to one or several subsets. However, within a given context, the relation between the business object and the segment(s) must be unequivocal.

Another example for inventory-related software solutions is in the field of commission systems containing a plurality of commission contracts between a company and its employees or contracting agents.

In order to be able to perform different tasks concerning statistical and evaluational aspects as well as concerning responsibilities and tasks or targets within the organizational structure of a company, it is important that business objects can be easily related to an employee or a contracting agent, or that a relation between a single contract and an inventory (subset) can be created. For example, typical relations can be the responsibility for all life insurance contracts in a given postal code area, the management of all car insurance contracts or the advisory function for all clients with profession physicists in the field of health insurance. It is easily understood by these examples that the segments are not directly created or classified but in connection with a given responsibility or task ("being in charge of", "managing", "advisory function", "contact person" etc.).

In order to be able to create an assignment between a given employee or contracting agent, i.e., the data object of that employee or contracting agent, and a segment, the business data objects in the data object component must contain pointer structures or other suitable reference information. If there are changes to either the business data objects or the employee/agent data objects, the corresponding reference information in the business data object has to be updated, i.e., the data contained in the data object component has to be attended to regularly and reliably. In practice, this is a potential source of malfunctioning as data attendance (or data maintenance) is not always performed in a reliable manner as it is an additional task to be performed by a human operator, and very often there is no direct understanding for the need to perform data maintenance.

SUMMARY OF THE INVENTION

Consistent with embodiments of the invention, data assignment systems and methods are provided which, among other benefits, allow for faster and more reliable access to related segments.

In accordance with one embodiment, an interface unit is provided which interconnects the computing unit and the data object component. The interface unit may be and constructed to include an inventory assignment of segments created in the data object component. Also, for an assignment inquiry by the computing unit, an assignment of one or more segments being inquired for may be carried out in the interface unit. Accordingly, consistent with the exemplary embodiments, operational systems may be able to determine for a given business object in connection with the responsibility the responsible employee/agent or, more generally, to determine for a given (classified) data object in connection with a relation, the related data object in the operational system of the computing unit.

In accordance with another embodiment, the interface unit may contain segment relations for the (business data objects contained in the data object component. The segment relations can either be based on keys or key terms which may be published, or on rules. Classifying, or dividing, data objects into segments may be based on given rules, on keys or—alternatively—on individual assignment. Therefore segment relation rules need not be input, stored, and maintained in the data object component, but are fully manageable in the interface unit.

For the mapping of segments, systems and methods consistent with an aspect of the invention may provide for customized defining of individual segment types. Each segment type may represent a certain segmentation (classification). The segments of a segment type form delimited segments according to given predefined criteria. An object within a segment type does not have to be related to a segment in an unequivocal manner.

Embodiments of the invention thus provide for the creation or generation of new object classes on the basis of existing data objects by way of segmentation. This allows for direct access to inventory data through an object class without the need of administering individual assignments. As an advantage, embodiments of the invention lead to non-hierarchical data structures and minimized data volume.

Consistent with yet additional embodiments of the invention, a computer readable medium with a computer program stored thereon may be provided. The computer program may comprise program coding means which are suitable for carrying out methods according to the invention as described above when the computer program is run on a computer.

Further features and embodiments of the invention will become apparent from the description and the accompanying drawings.

It will be understood that the features mentioned above and those described hereinafter'can be used not only in the combination specified but also in other combinations or on their own, without departing from the scope of the present invention.

Embodiments of the invention are schematically illustrated in the drawings by way of examples and are hereinafter explained in detail with reference to the drawings. It is understood that the description is in no way limiting on the scope of the present invention and is merely illustrative of embodiments of the invention.

DESCRIPTION OF THE EMBODIMENTS

Figure 1:
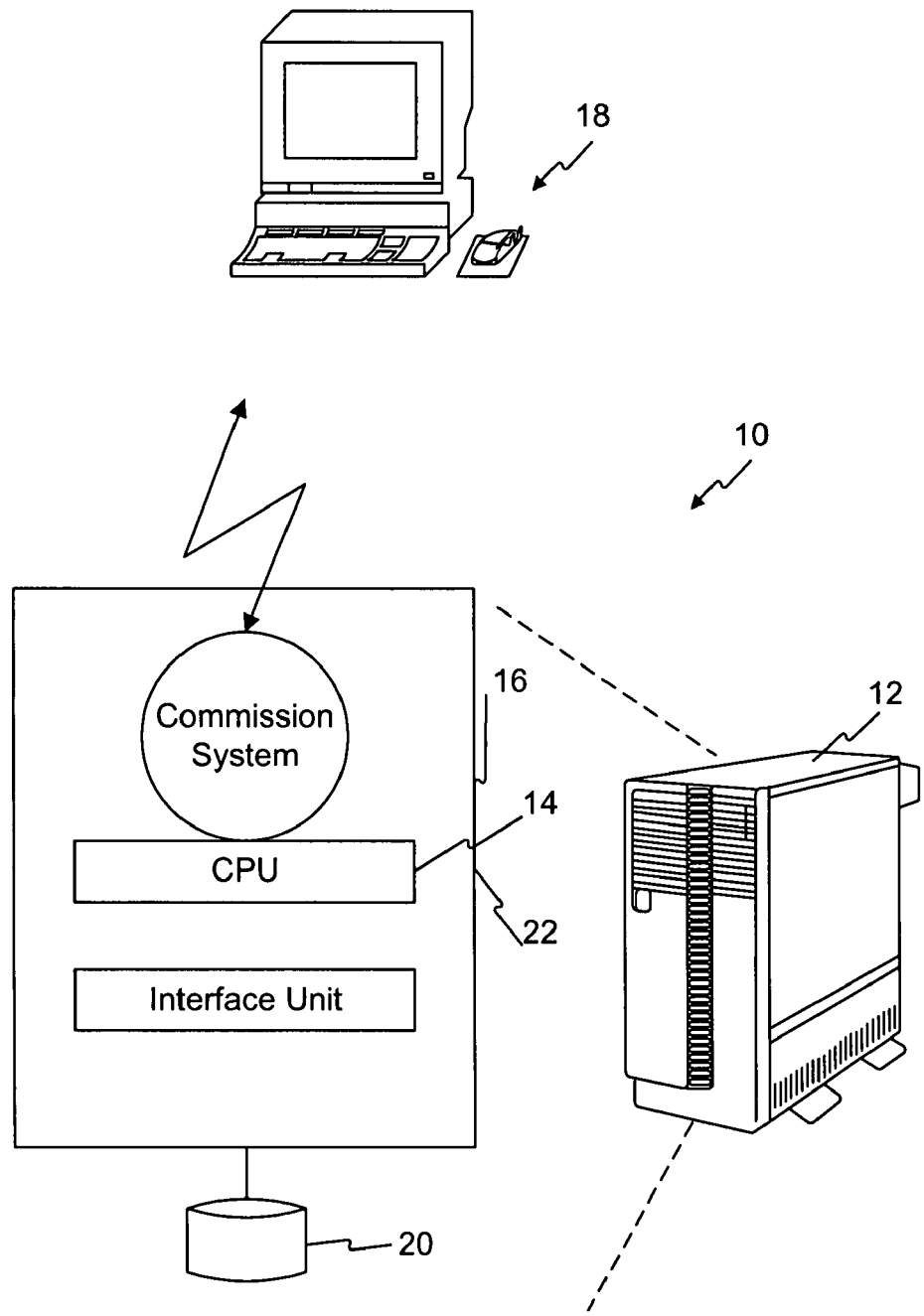
FIG. 1 is a schematic view of an exemplary data assignment computer system according to an embodiment of the invention.

FIG. 1 shows a schematic block diagram representation of a data assignment computer system 10 according to an embodiment of the present invention. Computer system 10 may comprise a server or computer unit 12 with a central processing unit 14 and a connection with at least one input/output means 18. Further, a commission system 16 may be installed and run on the computer unit 12. Commission system 16 serves for determining, retrieving and calculating remuneration payments such as commissions, bonus payments, etc. which are to be paid to employees or agents on the basis of achieved objectives. Still further, the computer unit may comprise an interface unit 22 which links the computer unit 12 to a database system 20 with data objects stored thereon.

The system as shown in FIG. 1 may be used in the field of data assignment of (inventory) data objects. As discussed above, it is appropriate to classify data objects belonging to a data object component 200 (cf. FIG. 2) into segments according to selectable criteria so that computing unit 12 can access selected/classified data objects via specific segment access in order to perform certain tasks.

Figure 2:
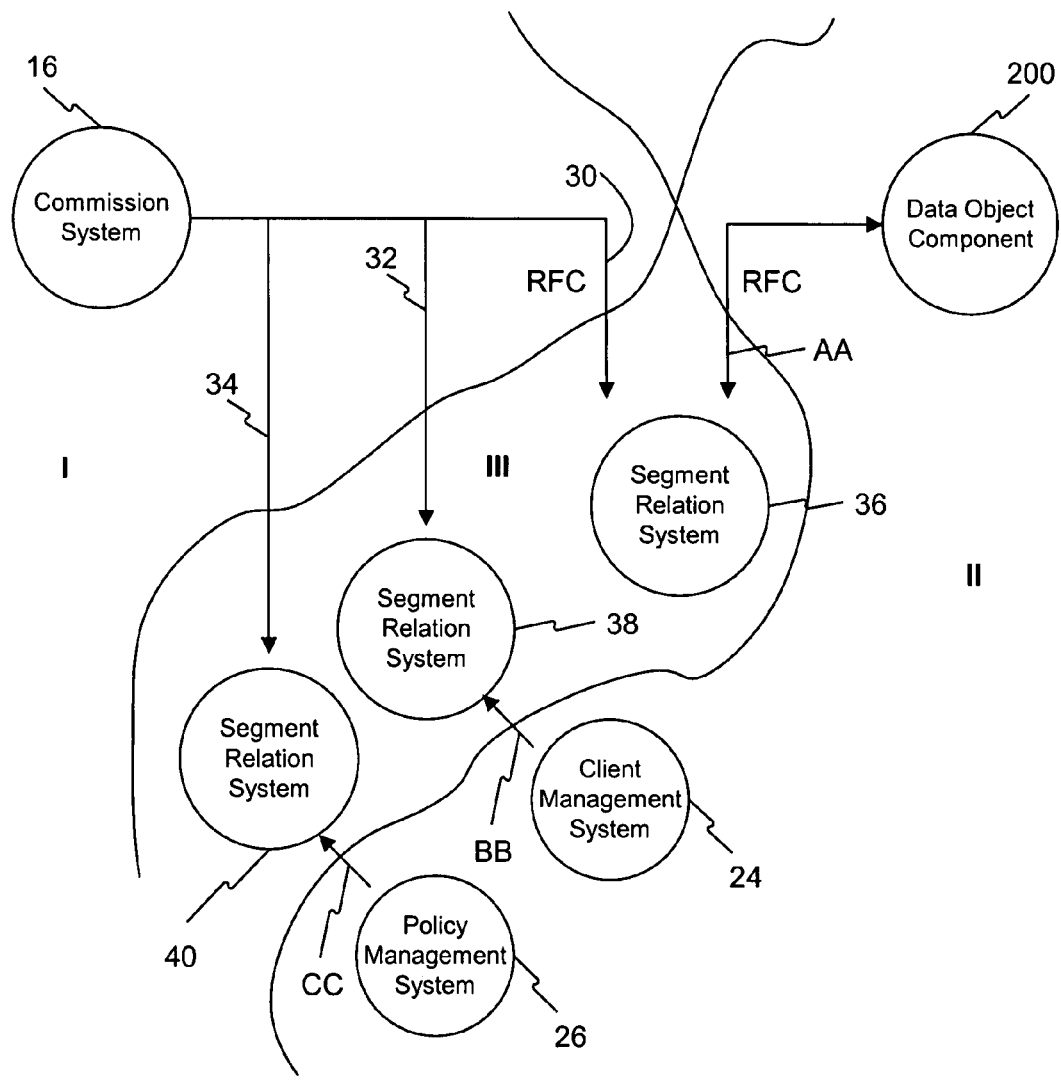
FIG. 2 is a schematic block diagram representation of an exemplary system according to an embodiment of the invention.

FIG. 2 depicts in more detail an exemplary data assignment system according to an embodiment of the invention. As can be seen from FIG. 2, an exemplary system according to the invention may include three components, namely a first component I which comprises the commission system 16 (commission component), a second component II which comprises the data object component 200 (inventory component) and a third component III (segment type component) which may comprise a modeling tool (not shown) for creating new object classes (segment types). The segment type component III may also comprise administration tools (not shown) for administering the objects of classes created by the modeling tool.

Commission component I may manage any kind of commission contract or commission remuneration system which relates achieved objectives to an employee or agent and calculates a remuneration entitlement in favor of this employee or agent. The data object component 200 in the inventory component II can be any kind of business enterprise solution which stores and manages various kind of business data objects, such as financial services solutions, data mining solutions or business warehouse solutions. However, the inventory component II can also comprise additional subcomponents in which business objects can be stored and managed, such as a client management system 24 and/or a policy management system 26 which manage insurance policies and/or client contracts.

According to one embodiment of the invention, the system type component III comprising a modeling tool is arranged and constructed to include an inventory assignment of segments created in the inventory component II such that, in the case of an assignment inquiry by the computing unit 12, i.e., the commission component I, an assignment of one or more segments being inquired for is carried out in the segment type component III.

In the context of a commission system, a segment may be a subset of an inventory. The segment can be arranged in different manners within a certain inventory. The type of inventory depends on the business and the field of business, e.g., insurance companies, software companies, car companies etc. The (external) segment relation defines the relationship between a segment and a commission contract stored in the commission system, such as depicted with reference numerals 30, 32, 34 in FIG. 2. The type of relation between the commission contract and the segment is defined via a commission relation agreement, i.e., whether a given commission case is triggered or not. In contrast to the above-mentioned external segment relations, internal segment relations are the relation between segment constituents (objects) and segment structure (typical attributes being grouping, aggregation, etc.).

The inventory of a business enterprise as stored in the inventory component II can be divided or classified in segments according to various criteria. For example, the segments can be related to employees or agents who are responsible for these segments, activities and achievements connected with said responsibility being remunerated by means of commissions.

According to the schematic block diagram of FIG. 2, the exemplary commission system 16 is connected with the segment type component III via so-called logical services and remote function call (RFC) functional units (depicted by arrows 30, 32, 34). The RFC units may provide access for the commission system 16 to the segment relation systems 36, 38, 40 of the segment type component M.

Inventory component II may comprise a data object component 200 (such as a financial services or data mining system), and a segment relation first BZO system 36 of the interface component BI is linked to this data object component 200 for reading and "managing" the data contained in the data object component 200. This first segment relation system 36 could be an agent system in which segment relations for data business objects of the data object component 200 are stored. Advantageously, the segment relations stored in segment relation system 36 are based on keys or key terms or on rules. Further segment relation systems can be provided in the interface component in order to be able to retrieve according segment data from additional inventory systems 24, 26, such as a client segment relation system 38 and/or a policy segment relation system 40. External relations between data object component 200 and additional inventory systems 24 and 26 are depicted by reference numerals AA, BB, and CC in FIG. 2.

Figure 3:
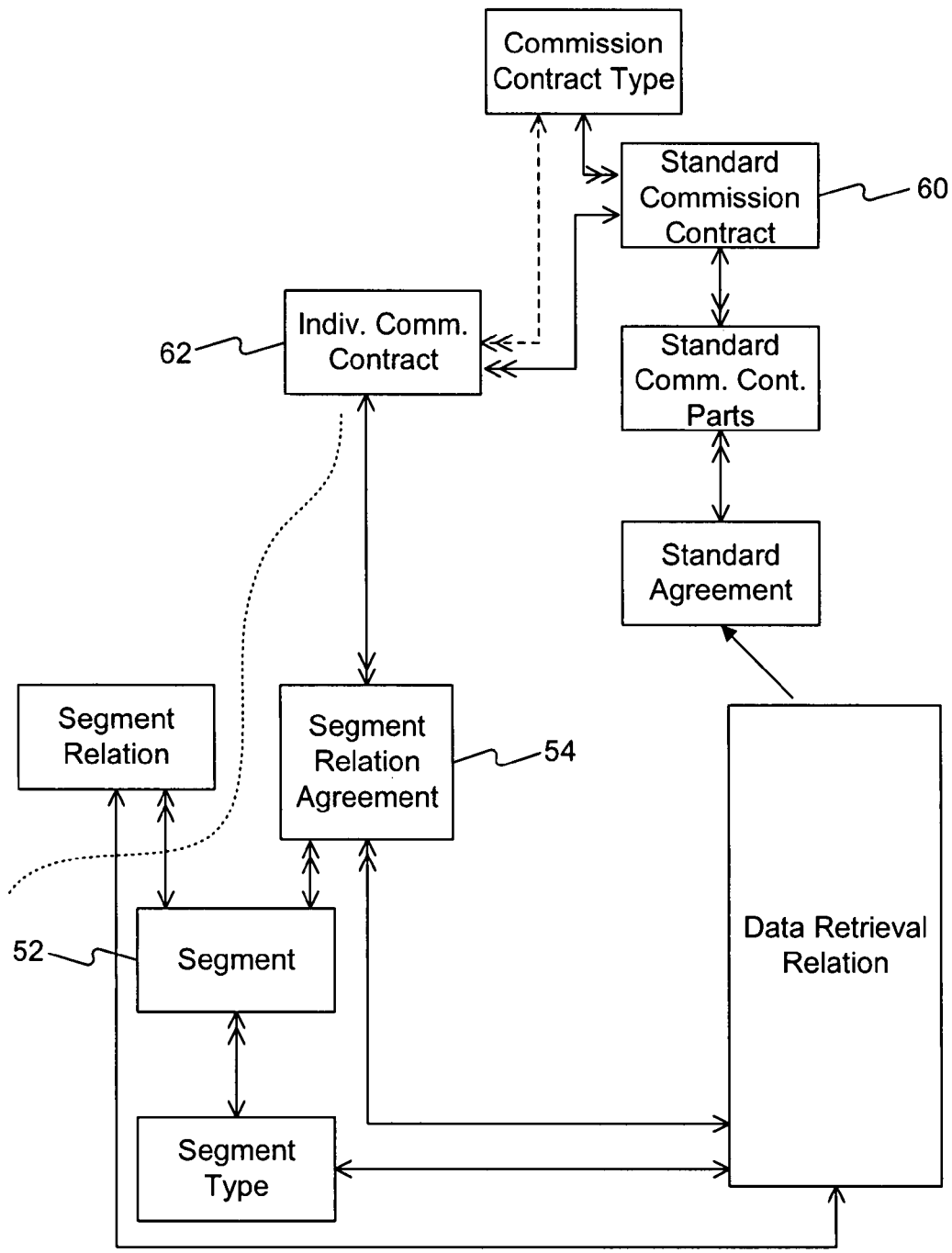
FIG. 3 shows a more detailed block diagram of an exemplary data assignment system according to an embodiment of the invention.

Segments, consistent with embodiments of the invention, may be selectively "edited" by single object assignment or by description assignment, and a segment can retrieve the set of all assigned and segmented objects (cf. also FIG. 3). An example for a single object assignment could be the allocation of a company XYZ to an object class "clients," an example for a description assignment could be the allocation of all clients with place of business in country CC to an object class "countries."

No rules concerning segment relations may have to be stored in the inventory component II as they are included in the interface component M, according to one embodiment of the invention. Instead of a direct link between commission component I and inventory component II, according to one embodiment of the invention, commission component I may access the data contained in the inventory component II via interface component III in which all necessary segment relation data (keys, rules) are stored. Thus, the interface component retrieves business data objects from the inventory component II on the basis of key terms and rules concerning various segment classification stored in the interface component III. For a given inquiry of the commission component I (i.e., commission system 16 running on computing unit 12) this enquiry is directed to the interface component III which in turn retrieves the relevant data from data object component 200 on the basis of stored relations, keys, key terms and/or rules.

Referring now to FIG. 3, in order to map segments, individual segment types 50 may be defined first in the customizing section of the user application. Each segment type may represent a certain way of looking at the inventory, i.e., various categories into which data objects of the inventory can be classified. For each segment type 50, segments 52 can be defined according to given criteria. In this context, it is to be pointed out that the arrows between the block diagram boxes in FIG. 3 are so-called 1:n arrows, i.e., a single arrowhead stands for an unequivocal unambiguous relation, and a double arrowhead stands for an equivocal ambiguous relation. For example, the segment type 50 may be the basis for a plurality of segments 52 (double arrowhead pointing from 50 to 52), but each of the segments 52 is based on one and only one segment type (single arrowhead pointing from 52 to 50). This means that there is a 1:n relation between segment type and segment. The segment type defines which object type is the target of the segment generation and according to which criteria the generation of subsets is performed.

In the commission system 16, one or more segments 52 can be related individually to one or several individual commission contracts 62 (an individual commission contract being based via a 1:n relation on a standard, commission contract 60). The relation of the segment to the individual commission contract can be done, as depicted in the exemplary embodiment shown in FIG. 3, via a segment relation agreement 54. Various types of relations can be maintained which is done via said segment relation agreement 54. The segment relation agreement may control the type of relationship between a commission contract and a segment, i.e., the system checks whether the cause for the existence of an additional commission case is identical for the related commission contract and the segment relation agreement. The segment relation agreement is related to a segment type in an unequivocal manner.

In terms of data modeling, a segment may correspond to a business object of a given business object type. A segment type in this context corresponds to a business object type with a certain characteristic or instance. An inventory can be divided or segmented into various segments according to various criteria. In most business enterprises, segmenting can be performed in various combinations according to, for example, the following criteria:

| inventory object type inventory | business object type segment type | business object segment (instance) |
|---|---|---|
| area | area related criteria | e.g., region, county, postal code |
| product | product group related criteria | e.g., contracts, products, services |
| client | client group related criteria | e.g., private, business, industry |

Figure 4:
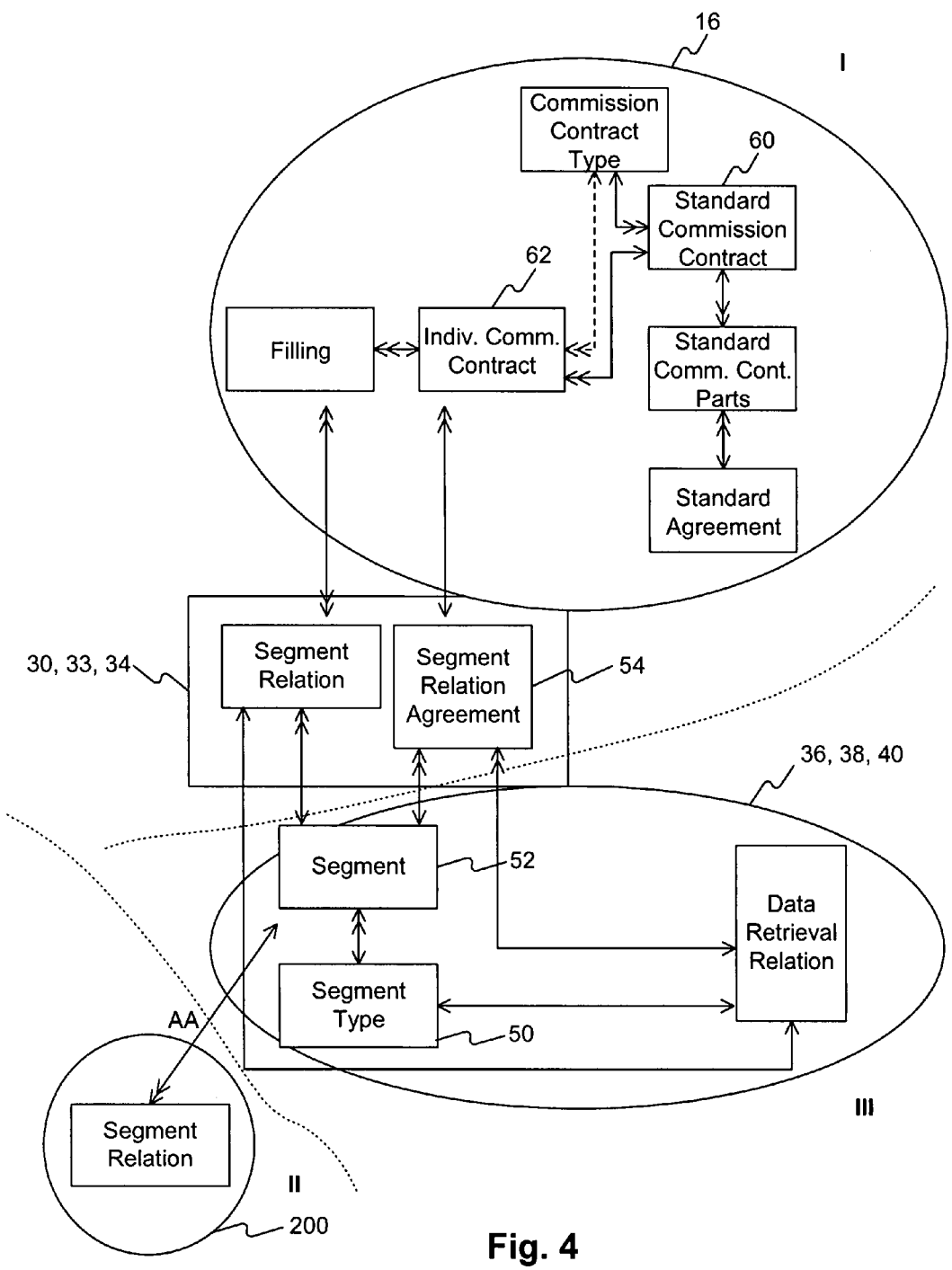
FIG. 4 shows the block diagram of FIG. 3 in an exemplary configuration according to the diagram representation of FIG. 2.

FIG. 4 shows the configuration of FIG. 3 in an arrangement according to FIG. 2; i.e., the elements of FIG. 3 are grouped and arranged in such a manner to illustrate to which of the components I, II, and III as described with reference to FIG. 2 they belong to. As can be seen, the elements "Segment Type" 50 and "Segment" 52 as well as the element "Data Retrieval Relation" may be comprised in the segment type component III where they are constituents of the segment relation systems 36, 38, 40. The element "Segmented Object" may belong to the data object component 200 in the inventory component II, and the remaining elements may be grouped in the commission component I where the elements "Segment Relation" and "Segment Relation Agreement" 54 may be comprised in the functional units 30, 32, 34. The elements relating to the actual Commission Contract may be comprised in the commission system 16.

Figure 5:
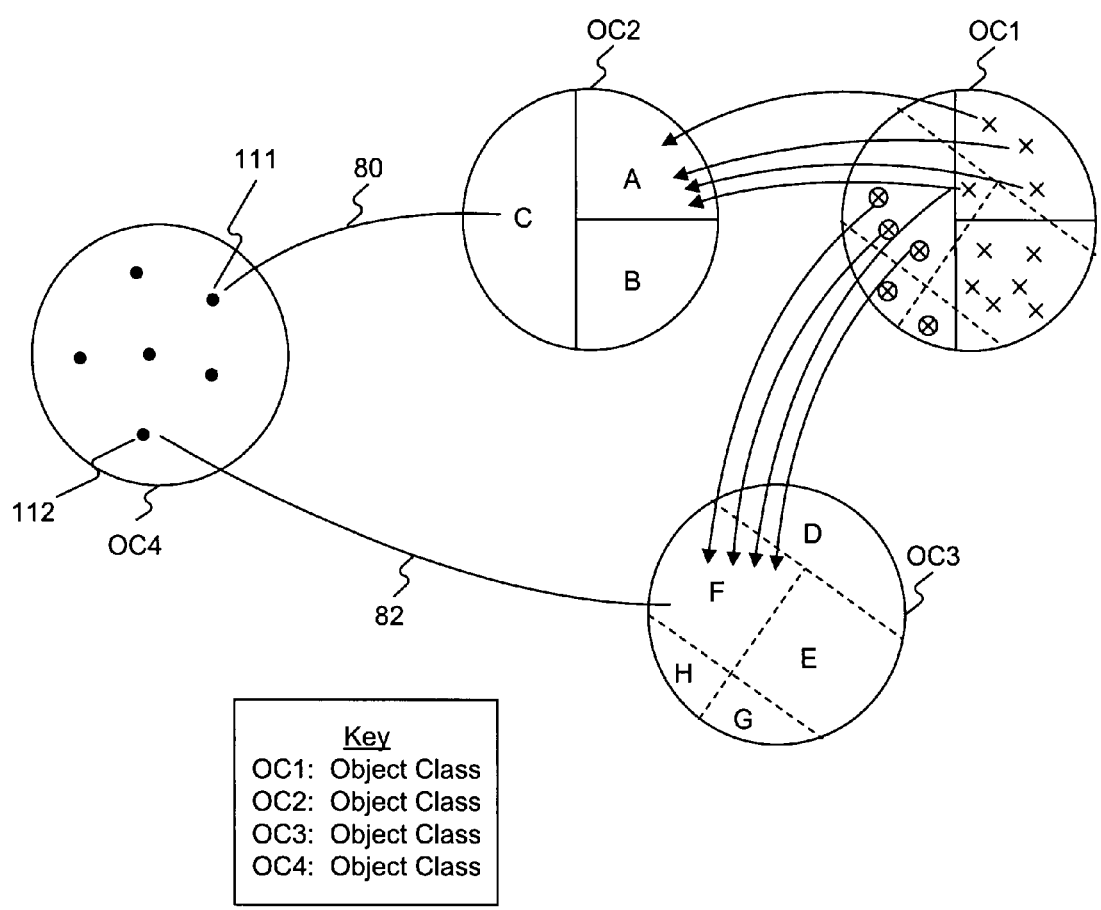
FIG. 5 shows a schematic illustration of an exemplary system according to an embodiment of the invention.

FIG. 5 shows a schematic illustration of an exemplary system according to an embodiment of the invention. By way of example, the system of FIG. 5 may be implemented in an insurance company. All of the clients (policy holders or insurance holders) of this insurance company constitute a set of data in an object class OC1. In the depiction of FIG. 5, object classes are shown schematically as circles, and the data objects are shown as crosses.

According to an embodiment of the invention, segments can be created for the objects "policy holders" on the basis of rules defined by the user. For example, as shown in the embodiment of FIG. 5, a classification of the policy holder objects in geographical areas results in the creation/segmentation of an object class OC2 with objects A, B, C, each of these segments representing a country, such as Germany (A), Austria (B) and Switzerland (C). Each of the newly created objects is assigned the corresponding objects from object class "policy holders" OC1 having their seat in the according countries, respectively. (In FIG. 5, this is illustrated by way of example only for the policy holder objects belonging to the object "Germany" A). It is to be understood that the delimitations of the three objects in object class OC2 is shown in object class OC1 for illustrative purposes only. The link between the objects of object class OC1 and the corresponding object A, B, or C in object class OC2 can be realized by relation, description, formulas, copying and/or any other manner known to the persons skilled in the art.

The objects "policy holders" of object class OC1 can be segmented according to a further rule, e.g., to an age group rule consisting in five age groups, as shown in FIG. 5 by way of example by dashed delimitation lines. This segmentation creates a new object class "age group" OC3 with five segments or objects D, E, F, G, and H. Each of the new objects D, E, F, G, and H is assigned the corresponding policy holder objects of object class OC1 (illustrated in FIG. 5 for the example of the policy holders belonging to age group F only). Again, the dashed lines delimiting the objects D to H in the circle depicting object class OC3 are shown in the circle of object class OC1 for illustrative purposes only.

Thus, there are three object classes OC1, OC2, and OC3, OC1 comprising 15 objects "policy holders", OC2 comprising three objects "countries", and OC3 comprising five objects "age groups".

Finally, there is a fourth object class in the embodiment of the invention illustrated in FIG. 5, namely object class OC4 comprising the employees of the insurance company (six objects shown as dots in the depiction of FIG. 5). If, for example, a first employee M1 is in charge of all policy holders with seat in Switzerland, this is shown with a relation between object M1 of object class OC4 and object C of object class OC2. Object C of object class OC2 in turn is related (80) to all objects "policy holders" contained in object class OC1 having their seat in Switzerland (these objects being shown in FIG. 5 as encircled crosses). The relation 80 between employee M1 and the clients with seat in Switzerland can contain further information or requirements, e.g., activities such as contract conclusion, client interview, contact person, etc.

A second employee M2 might be responsible for all clients belonging to age group F, which results in a corresponding relation 82 pointing from object employee M2 of object class OC4 to object F of object class OC3, and the relation can again contain according activities as explained above in connection with relation 80, or other activities.

Exemplary embodiments of the invention thus provide for the possibility of looking at an inventory under various angles which allows an additional commissioning (remuneration). The additional commission is usually paid periodically dependent on the inventory, the segment type or, respectively, the segment. The remuneration can be dependent on amount, quality, etc. of the segments. As an example, in many business fields, the term "inventory" usually stands for the complete set of a companies contracts and/or clients. Responsibility (i.e., being in charge of) of these inventory is usually compensated by means of a commission payment (inventory commission).

What is claimed is:

1. A method for data assignment in a computer system, the method comprising:
   providing the computer system including a computing unit, a data object component for managing a set of data objects, and an interface unit interconnecting the computing unit and the data object component, the interface unit containing segment relation data for data objects in said set of data objects, the segment relation data being based on keys or rules that concern a segment classification;
   dividing the data objects of said set of data objects into a plurality of segment types, each of the segment types among the plurality of segment types having one or more segments according to the segment classification, the segments being a subset of the set of data objects and related to the segment types, the data objects being divided into segments according to selectable criteria;
   creating, in said data object component, an inventory assignment of said segments, the inventory assignment of the segments being retrieved based on the keys or rules in the segment relation data and the segment classification; and
   based on an assignment inquiry by said computing unit, assigning, in the interface unit, one or more of said segments being inquired for.

2. The method according to claim 1, wherein new objects are created by dividing existing data objects class into segments, the new objects forming a new object class.

3. The method according to claim 1, wherein said segment relation data is based on rules.

4. The method according to claim 1, wherein in said interface unit, the segment type is defined containing one or more assignment rules for assigning data objects from said data object component to a given category in order to create one or more data object segments.

5. The method according to claim 1, wherein a type of relationship between a query data object of said computing unit and a segment is controlled by a segment relation agreement module contained in said interface.

6. The method according to claim 5, wherein the segment relation agreement module is created on the basis of a segment relation register contained in said data object component.

7. The method of claim 1 wherein, there is a one-to-many relation between the segment type and the segment.

8. A computer system comprising:
   a central processing unit provided in a computing unit; and
   a data object component for managing a set of data objects;
   an interface unit interconnecting the computing unit and the data object component, the interface unit containing segment relation data for data objects in said set of data objects, the segment relation data being based on keys or rules that concern a segment classification,
   wherein data objects of said set of data objects can be divided into a plurality of segment types, each of the segment types among the plurality of segment types having one or more segments according to the segment classification, the segments being a subset of the set of data objects and related to the segment types, the data objects being divided into segments according to selectable criteria, said interface unit being arranged and constructed to include an inventory assignment of said plurality of segments created in said data object component, the inventory assignment of the segments being retrieved based on the keys or rules in the segment relation data and the segment classification, and in case of an assignment inquiry by said computing unit, an assignment of one or more of said plurality of segments being inquired for is carried out in said interface unit.

9. The computer system according to claim 8, wherein new objects are created by dividing existing data objects class into segments, the new objects forming a new object class.

10. The computer system according to claim 8, wherein said segment relation data is based on rules.

11. The computer system according to claim 8, wherein in said interface unit the segment type can be defined containing one or more assignment rules for assigning data objects from said data object component to a given category in order to create one or more data object segments.

12. The computer system according to claim 8, wherein a type of relationship between a query data object of said computing unit and a segment is controlled by a segment relation agreement module contained in said interface.

13. The computer system according to claim 12, wherein said segment relation agreement module is created on the basis of a segment relation register contained in said data object component.

14. A tangibly embodied non-transitory computer-readable medium including instructions for performing a data assignment method, the method comprising:
   providing the computer system including a computing unit, a data object component for managing a set of data objects, and an interface unit interconnecting the computing unit and the data object component, the interface unit containing segment relation data for data objects in said set of data objects, the segment relation data being based on keys or rules that concern a segment classification;

dividing the data objects of said set of data objects into a plurality of segment types, each of the segment types among the plurality of segment types having one or more segments according to the segment classification, the segments being a subset of the set of data objects and related to the segment types, the data objects being divided into segments according to selectable criteria;

creating, in said data object component, an inventory assignment of said segments, the inventory assignment of the segments being retrieved based on the keys or rules in the segment relation data and the segment classification; and based on an assignment inquiry by said computing unit, assigning, in the interface unit, one or more of said segments being inquired for.

15. The computer-readable medium according to claim 14, wherein the dividing of the data objects into segments creates new objects.

16. The computer-readable medium according to claim 1, wherein said segment relation data is based on rules.

17. The computer-readable medium according to claim 14, wherein in said interface unit the segment type is defined containing one or more assignment rules for assigning data objects from said data object component to a given category in order to create one or more data object segments.

18. The computer-readable medium according to claim 14, wherein a type of relationship between a query data object of said computing unit and a segment is controlled by a segment relation agreement module contained in said interface.

19. The computer-readable storage device according to claim 18, wherein the segment relation agreement module is created on the basis of a segment relation register contained in said data object component.

* * * * *